Sept. 17, 1946. E. L. BIVANS 2,407,808
PEPPER MILL
Filed Jan. 22, 1945
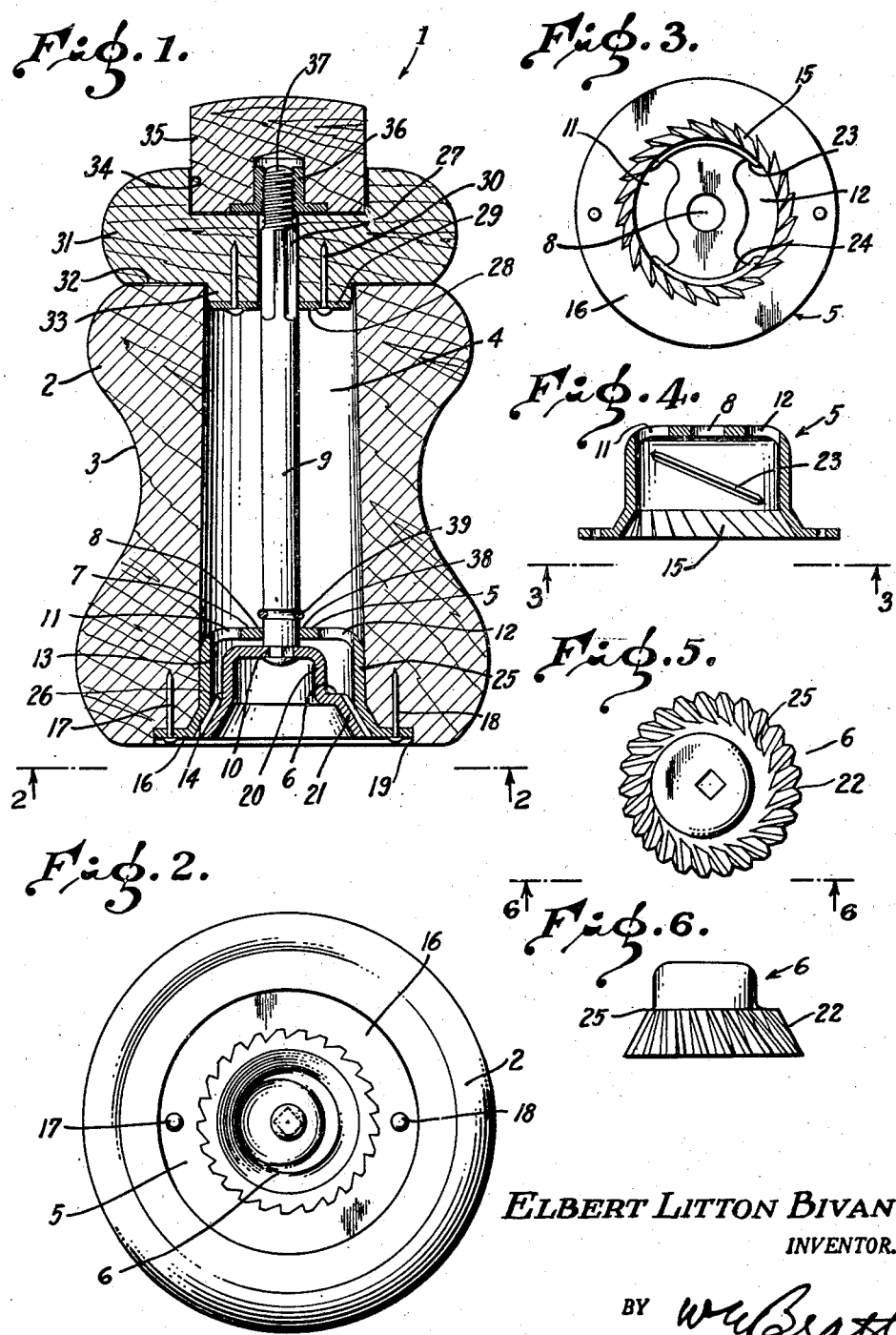
ELBERT LITTON BIVANS,
INVENTOR.
BY *W. U. Beatty*
ATTORNEY Patented Sept. 17, 1946

2,407,808

UNITED STATES PATENT OFFICE 2,407,808

PEPPER MILL

Elbert Litton Bivans, Los Angeles, Calif.

Application January 22, 1945, Serial No. 573,835

1 Claim. (Cl. 241—168)

The invention relates to a pepper mill and more particularly to grinding apparatus suitable for grinding peppercorns.

An object of the invention is to provide a construction making it possible to construct the grinding elements of sheet metal and in particular to provide the sheet metal elements with not only primary grinding surfaces, but also preliminary crushing means in order to increase the amount of material which may be ground for a given angular rotation of the rotary grinding element.

Other objects of the invention are to provide means for adjusting the fineness of the grind and to prevent the rotary grinding element from falling out of its casing when the cover is removed to refill the casing.

For further details of the invention reference may be made to the drawing, wherein:

Figure 1 is a vertical sectional view through a pepper mill according to the present invention.

Fig. 2 is a bottom plan view of the mill of Fig. 1, looking in the direction of the arrows on the line 2—2 of Fig. 1.

Fig. 3 is a bottom plan view of the outer grinding element, the inner rotary element being removed, looking in the direction of the arrows on the line 3—3 of Fig. 4.

Fig. 4 is a vertical sectional view through the outer grinding element of Fig. 3.

Fig. 5 is a plan view looking down on the inner grinding element.

Fig. 6 is a side elevation of the inner grinding element of Fig. 5, looking in the direction of the arrows on the line 6—6 of Fig. 5.

Referring in detail to the drawing, the pepper mill 1 of this invention comprises a casing 2 which may be of wood or other material, and provided with a depression or hand-hold 3 so that it may be held in the hand. The casing 2 is provided with a central bore 4 to receive the peppercorns or the like to be ground. In the bottom of the bore 4 is arranged outer and inner grinding elements 5 and 6 which are inverted cup-shaped sheet metal stampings, one fitting within the other. The outer element 5 has an end wall 7 provided with a bearing bore 8 to rotatably receive a shaft 9 which is riveted or otherwise secured to the end wall 10 of the inner element 6. The end wall 7 of the outer element 5 at each side of the bearing bore 8 is provided with a plurality of apertures 11 and 12 through which the peppercorns may pass to be ground. The innermost portion 13 of the side wall of the outer element 5 is cylindrical and fits in the bore 4. The cylindrical portion 13 merges with an outwardly flaring conical portion 14 provided on its outer surface with ridges 15 which serve as grinding elements and which lie substantially on the surface of a cone where the conical wall 14 merges with an outwardly flaring flat rim 16, through which nails or other fastening means 17 and 18 are driven to secure the rim or flange 16 in a recess 19 in the bottom of the casing 2.

The inner element 6 has a side wall, the innermost portion 20 of which is cylindrical but eccentric to the axis of shaft 19. The eccentric wall 20 merges with an outwardly-flaring conical portion 21 provided on its outer surface with co-operating grinding ridges 22 shown in Fig. 6, which lie on the surface of a cone coaxial or concentric with the shaft 9.

Struck out from the inside of the cylindrical wall 13 of the outer element 15 is a pair of inclined ridges 23 and 24, shown in Figs. 3 and 4, which lie opposite the eccentric portion 20 of the inner element, and cooperate therewith to effect preliminary crushing of the peppercorns. The inclined ridges 23 and 24 also serve to guide the peppercorns to the grinding teeth 15 and 22, assuming that the inner element is rotated in a clockwise direction. Also, the ridges 22 are substantially longer than the ridges 15, whereby the inner ends 25 of the ridges 22 extend opposite the outer inner end of the cylindrical portion 13 and provide a tapered space 26 in which preliminary crushing is effected.

The upper end of the shaft 9 is provided with a non-circular portion 27 which slidingly fits in a mating, non-circular aperture 28 in a washer 29 secured as by nails 30 to the underside of a rotary cover 31 having a flat portion 32 which fits on the upper end of casing 2 and having a cylindrical extension 33 which fits in the upper end of the bore 4.

The outer end of rotary cover 31 is provided with a circular recess 34 in which is rotatably fitted a handle or knob 35 in which is secured a nut 36 threaded on the outer threaded end 37 of the shaft 9. By rotating the knob 35 in one direction or the other, the shaft 9 may be raised or lowered to vary the separation of the grinding surface 15 from its cooperating grinding surface 22, to vary the fineness of grind.

In order to fill the bore 4 with peppercorns, the knob 35 may be unscrewed from shaft 9 and the knob 35 and cover 31 removed from that shaft. To prevent the shaft 9 and the inner grinding element 6 from falling out of the bearing bore 8, above this bore is arranged a spring lock ring 38 arranged in a groove 39 in the shaft 9.

Various modifications may be made in the invention without departing from the spirit of the following claim.

I claim:

Grinding apparatus comprising sheet metal inverted cup-shaped inner and outer grinding elements, one within the other, said outer grinding element having an end wall having a bearing aperture centrally thereof and feed apertures on opposite sides of said bearing aperture, said outer member having a side wall the innermost portion of which is provided on its inside with inclined ridges and the outermost portion of which is provided on its interior with a comparatively short conical grinding surface concentric with said bearing aperture, a shaft rotatably supported in said bearing aperture in said outer element and secured to said inner element, said inner element having an eccentric side wall opposite said ridges and on its outer surface having a comparatively long conical grinding surface concentric with said shaft, the inner end of said grinding surface on said inner element projecting inwardly beyond the inner end of the grinding surface on said outer element whereby preliminary crushing is effected between said eccentric portion of said inner element and said ridges on said outer element and also between the side wall of said outer element and the inner end of the grinding surface of said inner element.

ELBERT LITTON BIVANS.